United States Patent

Pugel

Patent Number: 5,748,261
Date of Patent: *May 5, 1998

[54] VIDEO RECEIVER USER CHANNEL SELECTION CONTROL OF AN RF MODULATOR

[75] Inventor: Michael Anthony Pugel, Noblesville, Ind.

[73] Assignee: Thomson Consumer Electronics, Inc., Indianapolis, Ind.

[*] Notice: The term of this patent shall not extend beyond the expiration date of Pat. No. 5,541,671.

[21] Appl. No.: 618,956

[22] Filed: Mar. 20, 1996

Related U.S. Application Data

[62] Division of Ser. No. 384,299, Feb. 6, 1995, Pat. No. 5,541,671.

[51] Int. Cl.$^6$ .................................................... H04N 5/40
[52] U.S. Cl. ............................ 348/724; 396/46; 348/553
[58] Field of Search .................................. 348/10, 553, 554, 348/555, 556, 558, 563, 569, 570, 724, 731, 734; 455/6.2; 386/46; H04N 5/40, 5/75

[56] References Cited

U.S. PATENT DOCUMENTS

| | | |
|---|---|---|
| 4,336,555 | 6/1982 | Wine. |
| 4,717,970 | 1/1988 | Long. |
| 5,029,015 | 7/1991 | Baxter ............................ 348/731 X |
| 5,227,881 | 7/1993 | Wess et al. ......................... 348/734 X |
| 5,467,141 | 11/1995 | Ligertwood ............................ 348/555 |
| 5,541,671 | 7/1996 | Pugel ................................... 348/724 |

OTHER PUBLICATIONS

Owner's Instruction Manual for the Samsung VX-330 Video Cassette Recorder, Cover and pp. 7-8 and 11-12.
Owner's Instruction Manual for the Samsung XD3500 8 mm Video Cassette Recorder, Cover and pp. 5-6 and 17-18.
Continuation Appln. Serial No. 08/022,119, filed Mar. 10, 1993, Art Group 2602, Examiner S. Hsia, Remodulation of a Cable Box Output Signal to a UHF Channel —L. S. Wignot.

Primary Examiner—John K. Peng
Assistant Examiner—Nathan J. Flynn
Attorney, Agent, or Firm—Joseph S. Tripoli; Ronald H. Kurdyla; Alexander J. Burke

[57] ABSTRACT

A satellite video receiver (12) for providing output signals to a television signal receiver (52) includes apparatus (10, 15, 16, 20, 45, 60, 65, 70) for operator selection of the modulator output channel frequency of the satellite receiver. The operator may select a modulator main channel, or an alternative manufacturer pre-set modulator default channel. In a first recovery mode, the operator may automatically replace an existing modulator channel with a manufacturer pre-set default channel, e.g., if a chosen main channel is forgotten. In another recovery mode, the operator may automatically re-establish a previously selected modulator main channel recalled from memory.

12 Claims, 2 Drawing Sheets

VIDEO RECEIVER USER CHANNEL SELECTION CONTROL OF AN RF MODULATOR

This application is a division of application Ser. No. 08/384,299, by M. A. Pugel, filed Feb. 6th 1995, now U.S. Pat. No. 5,541,671.

FIELD OF THE INVENTION

This invention is related to the field of video signal receiving apparatus. In particular, the invention concerns a system for selecting an RF modulator output channel in a direct broadcast satellite receiver, for example.

BACKGROUND OF THE INVENTION

Video signal receivers such as direct broadcast satellite receivers and video cassette recorders (VCRs) provide video output signals as Radio Frequency (RF) modulated signals to a television receiver, for example. The carrier frequency selected for this RF modulation in the United States, for example, is usually the broadcast channel 3 or channel 4 cable television (CATV) carrier frequency. Selection of one of these channels is typically accomplished by means of a user operated manual switch. This switch is usually located on the VCR or satellite receiver unit. The operator using a satellite receiver, for example, is typically directed by an instruction manual to select the broadcast channel (3 or 4) that is not used in the operator's local broadcast area. The operator then selects that same channel on the television receiver to ensure that the television receiver is tuned to the same carrier frequency as the satellite receiver RF output.

A problem may arise when both channel 3 and channel 4 are unavailable for use as modulator channels by the satellite receiver. This may occur if one channel is in use in a particular local broadcast area, and the other channel is unusable/unavailable due to being corrupted by broadcast interference. In another situation, both channels 3 and 4 may already be in use. This may occur, for example, if the output of the satellite receiver is being combined with a cable television signal.

In such case one channel may carry a television signal and the other channel may already be used as a modulator channel. In these situations the operator may be forced to use a television signal broadcast channel as the satellite receiver output modulator channel. As a result, the operator loses a television signal broadcast channel since any television signal being transmitted on that channel prior to modulation will be lost in the modulation process.

To address these situations, some advanced video receivers use continuously adjustable RF modulators instead of channel 3/4 switches. The adjustable RF modulators allow an unused television channel in the channel 1–125 band, for example, to be used as the modulator channel. Although the satellite receiver may be manufacturer pre-set to a certain modulator channel, for example channel 65, when delivered to the consumer/operator, the operator is able to select any of the available channels as the modulator channel. The operator may do this by means of a particular menu selection using a remote control device.

Operator adjustable modulators may present problems. One problem that may arise is incompatibility between a video receiver (satellite receiver or VCR) modulator output channel and the channel to which a television receiver, receiving the modulator output, is tuned. Such an incompatibility may occur if the operator is unaware of the modulator channel setting of the video receiver, and sets the television receiver to a different channel. Then, the television receiver tuner will not be set to the same carrier frequency as the video receiver RF output signal.

This situation may occur if the operator forgets which modulator channel he has selected, if he inadvertently changes the modulator channel, or the modulator channel is changed without his knowledge. These situations are more likely to arise with video receivers that use operator adjustable modulators with a wide, continuously adjustable frequency selection range. In such a case there is a greater opportunity for an operator to erroneously set a modulator channel, or to forget a previously selected modulator channel. The operator may then set the television receiver to an incompatible channel. As a result the television tuner will not be set to the carrier frequency of the video receiver modulator, and the television receiver will not display a valid picture. The operator may interpret this result as an equipment failure.

SUMMARY OF THE INVENTION

The inventor has recognized that it is advantageous for an operator to be able to directly set the adjustable modulator of a video receiver (such as a satellite receiver or VCR) to a desired channel. The inventor has also recognized that it is desirable for one or more manufacturer pre-set modulator channels (default channels) to be individually directly selectable by the operator.

In a system in accordance with the principles of the present invention, a video receiver such as a satellite video receiver, provides output signals to a television receiver. The video receiver also includes apparatus for operator selection of the modulator output channel frequency of the satellite receiver. The apparatus permits the operator to select a modulator main channel chosen by the operator, or alternatively a manufacturer pre-set default channel. The apparatus also permits the operator to automatically engage a manufacturer pre-set default channel in a recovery mode, e.g., if a chosen main channel is forgotten. In another recovery mode, the operator may automatically recall from memory a previously set modulator main channel.

In accordance with a feature of the invention, the operator may select the default channel from a range of discretely selectable channels. In accordance with another feature of the invention, a visual display indication of the selected modulator channel is provided.

DETAILED DESCRIPTION OF THE DRAWINGS

Figure 1:
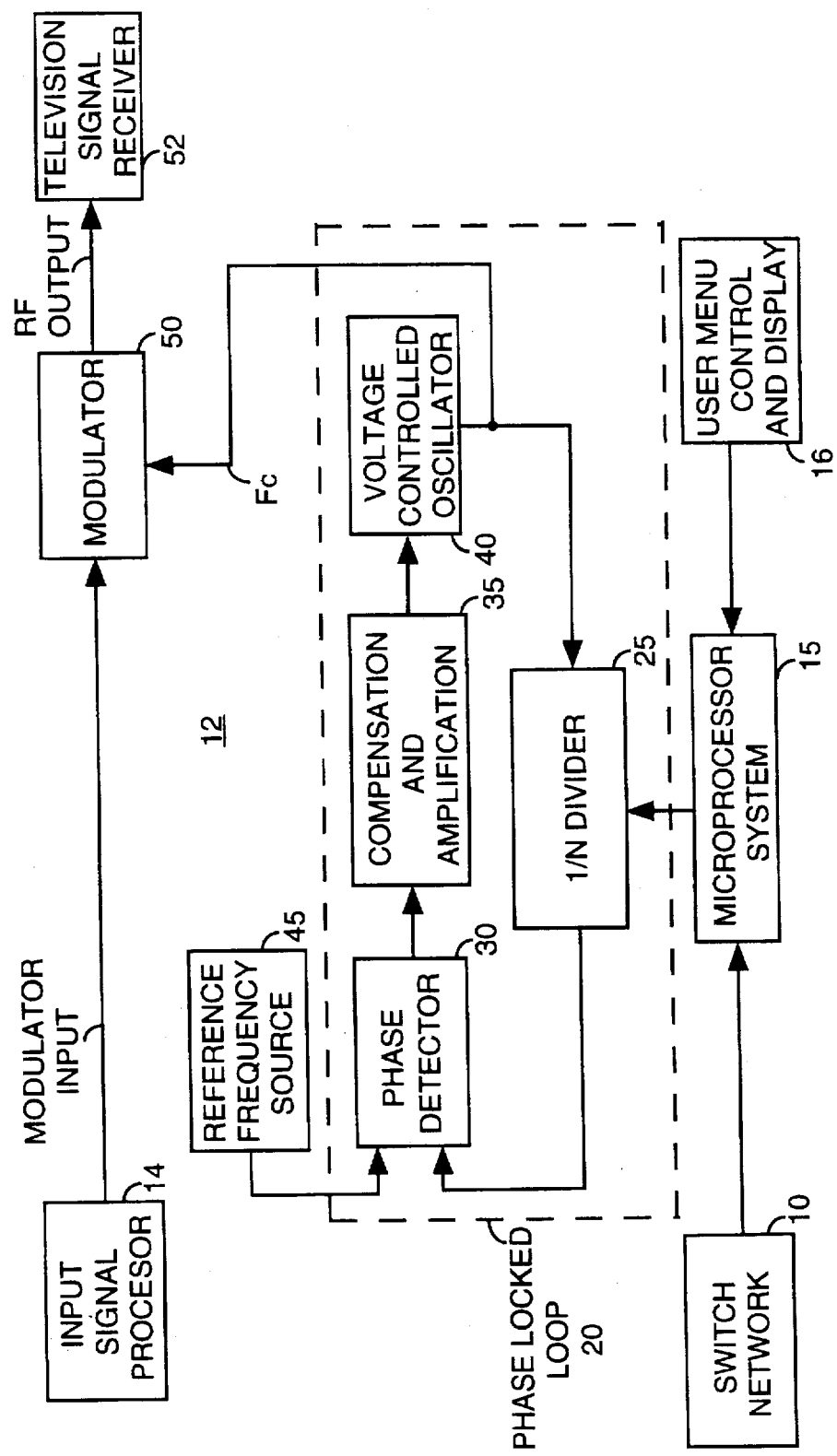
FIG. 1 shows an adjustable RF modulator for a video receiver according to the invention.

A satellite video signal receiver modulator stage 12 incorporating the principles of the invention is shown in the block diagram of FIG. 1. A received video signal, after processing by an input processor 14, is modulated onto a carrier frequency Fc by modulator 50. Modulator 50 receives the carrier frequency from a Phase-locked Loop (PLL) network 20 and provides an RF modulated output signal to a television receiver 52. The PLL output carrier frequency Fc is determined by a microprocessor 15 and by a reference frequency provided by a source 45. Microprocessor 15 selects the channel that is used as the modulator channel by controlling the carrier frequency Fc that is output by PLL 20. Microprocessor 15 selects the modulator channel in response to inputs received from an operator usable switch network 10 and an operator menu control and display network 16.

The operator may use menu control 16 to select a main (non-default) channel as the modulator channel only when the satellite receiver and the television receiver are compatibly tuned to the same modulator channel frequency so that a valid image is displayed by the television receiver, which displays the menu. As an alternative to selecting the main channel as the modulator channel using control 16, the operator may select a predetermined (manufacturer set) default channel as the modulator channel using switch network 10. The operator in using menu control 16 of the satellite receiver to select the modulator channel sets the modulator output channel frequency Fc for the satellite receiver. This new frequency may be a manufacturer pre-set default channel frequency, or a main non-default channel frequency.

If a main channel is chosen, a problem may arise if the operator forgets the channel, if another operator changes the main channel, or if the main channel is "forgotten" by the system, e.g., in the case of an electrical fault. In order to recover from these situations, it is desirable to return the system to a known modulator channel configuration. In a first recovery mode, this may be done by selecting a manufacturer pre-set default channel to override the current modulator channel selection, by means of switch 10, for example. In a second recovery mode, this may be done by recalling a previous main channel selection from memory.

An operator may use switch network 10 to manually select a predetermined (manufacturer set) default modulator channel without having to scroll option menus (using control 16) displayed by the television receiver. An operator may also use switch network 10 without having to obtain a valid television picture display. This is important because both of these actions may be impossible if there is an incompatibility between the satellite receiver and television receiver modulator channel settings. This means that the possibility such an incompatibility caused a television receiver picture loss cannot be eliminated without operator intervention. The operator intervenes, under the direction of the operator's instruction manual, by selecting the modulator default channel using switch network 10 as part of a set-up or fault diagnosis procedure. The procedure directs the operator to first select a satellite receiver modulator default channel, and then to select the same channel on the television receiver. By this procedure the operator restores the receiver equipment to a known usable state with both the satellite receiver and television receiver compatibly tuned to the same channel.

Switch network 10 illustratively comprises three multifunction pushbuttons that are mounted on the satellite receiver unit and are accessible to the operator. In order to restore the satellite receiver to a predetermined modulator default channel set by the manufacturer, the operator presses the three pushbuttons of network 10 in a prescribed sequence. Both this prescribed sequence and the actual channel used as the default channel may be disclosed to the operator in the owner's instruction manual, or by printed instruction on the satellite receiver unit itself. More than one default channel may be available for selection using different pushbutton sequences. This improves the likelihood that the operator can select a default channel that is unused in his local broadcast area. The operator may prefer to manually select the modulator default channel using switch network 10 if selecting the modulator channel from a displayed menu obtained by using control 16 is more complicated.

Pushbutton activation of the switches in network 10 is detected by microprocessor 15, which periodically monitors the status of switch network 10. The pushbuttons are arranged so that they provide, on activation, a change in the logic state of digital signals which are periodically read by microprocessor 15.

Alternatively, for example, these signals may be coupled to the microprocessor interrupt inputs. In this case pushbutton activation interrupts the operation of microprocessor 15 so that microprocessor 15 does not need to periodically read switch network 10.

Microprocessor 15 both detects and decodes the sequence of pushbutton activation. Upon recognizing a prescribed sequence, microprocessor 15 instructs PLL 20 to output the default channel carrier frequency to the carrier frequency input of modulator 50. The default channel setting is stored in non-volatile memory of microprocessor 15. Preferably, the default channel is hard-coded in microprocessor 15 by the manufacturer.

PLL 20 is a conventional programmable phase locked loop composed of a phase/frequency detector 30, a compensation and amplification network 35, a voltage controlled oscillator (VCO) 40 and a programmable frequency divider 25. A logic control value is written by microprocessor 15 into a register in programmable divider 25 to determine the PLL output carrier frequency Fc provided by VCO 40 to modulator 50.

The PLL output frequency is divided by programmable divider 25 and compared by detector 30 to a frequency reference from source 45. The division performed by divider 25 is determined by the logic control value written to a register within divider 25 by microprocessor 15. An output voltage of detector 30, representing the phase/frequency error, is amplified and compensated by unit 35 to provide an oscillation frequency control signal to VCO 40. The amplification and compensation provided by unit 35 ensures the stability of the PLL. The compensation may be in the form of filtering as known.

Similarly, microprocessor 15 monitors the status of output signals produced by menu control 16 in response to operator selection of a modulator main channel. Microprocessor 15 responds to these signals by causing PLL 20 to generate an output carrier signal Fc at the frequency of the modulator main channel selected by the operator using menu control 16.

The VCO 40 output frequency determined by microprocessor 15 is the carrier frequency used by modulator 50.

Modulator 50 frequency modulates this carrier frequency with the input signal from source 14 containing the video information to be output by the satellite receiver. The output signal from modulator 50 is a frequency modulated RF signal containing the desired video information. This output signal is provided to other units as required, such as a television receiver. The carrier frequency of the satellite receiver output signal is the default channel frequency selected by microprocessor 15 via switch network 10, or the main channel frequency selected via menu control 16.

Switch network 10 of FIG. 1 may exhibit a variety of configurations in addition to multi-function pushbuttons as discussed. For example, network 10 may use a single dedicated switch with several fixed positions. One of these positions may select a manufacturer set default channel as an alternative to a modulator main channel selected from a displayed menu using control 16. A second position, in a recovery mode, may cause the satellite receiver to revert to a main channel previously selected by the operator using the selection menus. In another recovery mode, a third position may cause the satellite receiver to automatically select a manufacturer pre-set default channel. Other switch positions may provide additional manufacture set default channels. This result would also be useful when the operator has forgotten the previously set modulator main channel. In this case the default channel provided would be known to the operator from the instruction manual, or it may be displayed, for example, by means of a display panel 70 shown in FIG. 2.

Figure 2:
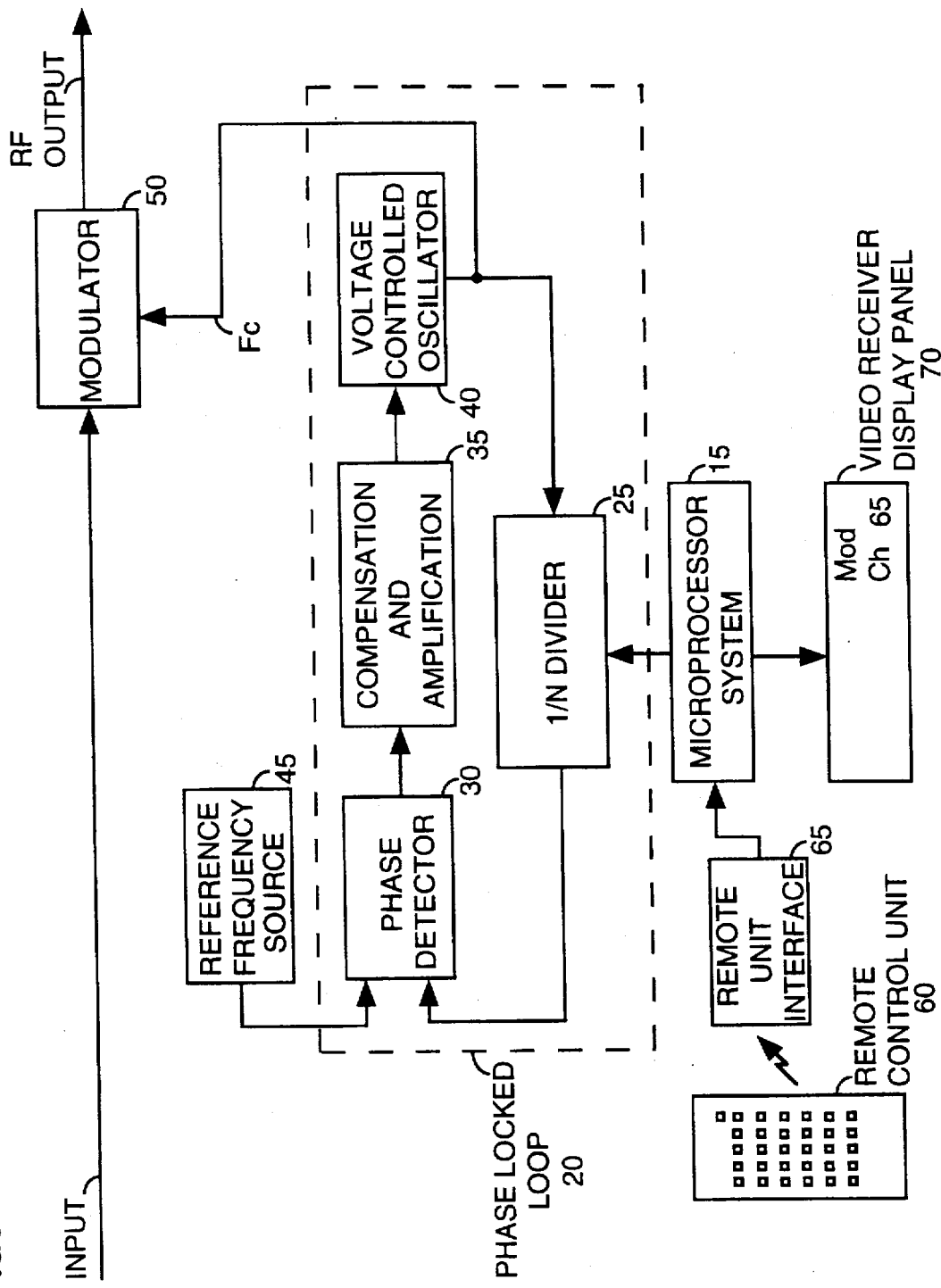
FIG. 2 shows an adjustable RF modulator for a video receiver according to the invention involving a remote control unit and a modulator channel display.

Another embodiment of the invention is shown in FIG. 2. In FIG. 2 the default channel selection and the main channel selection are both accomplished using a reunit control unit 60. In FIG. 1 in contrast, a manufacturer pre-set default channel is selected using switch network 10, and modulator main channels are selected by the operator using menu display control 16. The system of FIG. 2 includes viewer operated infra-red remote control unit 60, a receiver infra-red remote control interface network 65 and a representation of a satellite receiver display panel 70 which are not present in the system of FIG. 1.

Other elements in FIG. 2 correspond to similarly labeled elements in FIG. 1. Units 60 and 65 are of conventional infrared type design but could also be a different design type such as units that operate at radio frequency, for example.

In the embodiment of FIG. 2 the operator selects a main channel or a manufacturer pre-set default channel by, for example, pressing a designated pushbutton or a sequence of pushbuttons on remote control unit 60. A resulting infra-red output signal from unit 60 is transmitted to infra-red receiver interface network 65. Network 65 decodes the infra-red signal and provides a resultant decoded command signal to microprocessor 15. Upon receipt of this command signal, microprocessor 15 programs PLL 20 to output the selected channel carrier frequency. This is performed in the manner described in connection with the embodiment of FIG. 1. Finally, also as described in connection with FIG. 1, modulator 50 frequency modulates the selected channel carrier frequency with the video information of the input signal.

Additional pushbuttons or sequences thereof may provide first and second recovery modes respectively automatically engaging a manufacturer default channel, or recalling from memory a previously selected modulator main channel, as discussed in connection with FIG. 1.

The number of the channel selected by microprocessor 15 as the satellite receiver output modulator channel is displayed by satellite receiver display panel 70. This visual indication may be a standard Light Emitting Diode (LED) type of display and is driven by microprocessor 15. However, other types of display devices may also be used, such as Liquid Crystal Displays (LCDs).

The operator, on viewing the display, can immediately determine if there is an incompatibility between the satellite receiver modulator output channel frequency and the channel to which an associated television receiver is tuned. If an incompatibility exists, the operator can use remote unit 60 to select a default channel or a main channel as the modulator channel.

If display 70 is not provided in the FIG. 2 embodiment, the operator cannot visually determine that there is an incompatibility between the satellite receiver and television tuner channels. This means, that operator intervention is required to determine whether such an incompatibility exists and is responsible for picture loss on the television receiver.

The operator intervenes by selecting the modulator default channel, using remote control 60, under the instruction of the user's manual.

In the disclosed system, both main channel and default channel modulator frequencies are selected from the UHF broadcast television band to facilitate channel tuning. In other systems, channel selections may be from different bands in accordance with the requirements of a particular system. Also, the disclosed modulator output channel selection system may be used in a VCR as well as in a satellite receiver.

What is claimed:

1. A video signal receiver for modulating a carrier with received input information to provide a modulated output signal compatible with a television signal receiver, said carrier being located in a television broadcast band associated with a single video transmission standard, said video receiver including apparatus comprising:

means for generating channel carriers at carrier frequencies within said band, and having a control input and an output for providing a generated channel carrier in response to a control signal applied to said control input;

first user operated means providing a first control signal to said control input of said generating means for manually selecting a generated channel carrier in said band;

second user operated means providing a second control signal to said control input of said generating means for manually selecting a manufacturer preselected available channel carrier in said band as an alternative to said channel carrier selected by said first means, said manufacturer preselected available channel carrier being predetermined to allow said user to ensure channel compatibility with a television receiver coupled to said video receiver upon activation of said second user operated means; and means, having an input coupled to said output of said generating means, for modulating a generated carrier selected by said first means or a carrier selected by said second means with said received input information to provide said modulated output signal; wherein said channel carrier selected by said first user operated means is a channel carrier other than said manufacturer preselected available channel carrier.

2. Apparatus according to claim 1, wherein
a representation of said manufacturer preselected channel carrier is stored in non-volatile memory.

3. Apparatus according to claim 1, and further including means for automatically replacing a channel carrier selected by said first means with said manufacturer preselected channel carrier.

4. Apparatus according to claim 1, wherein
said second means further includes multi-function switches.

5. Apparatus according to claim 1, wherein
the functions of said first and second means are implemented by a remote control device.

6. Apparatus according to claim 1, further including
means for providing a visual display indication of an output channel carrier from said generating means.

7. Apparatus according to claim 1, wherein
said channel carriers respectively selected by said first means and said second means are located in the UHF broadcast television spectrum.

8. In a video signal receiver for modulating a carrier with received input information to provide a modulated output signal compatible with a television signal receiver, said carrier being located in a television broadcast band associated with a single video transmission standard, a method for user selection of an output channel carrier comprising the steps of:

(a) selecting a manufacturer preselected channel carrier from within said band, said manufacturer preselected channel carrier being known to said user prior to said selection;

(b) selecting an alternative channel carrier known to said user from within said band, said alternative channel carrier being other than a manufacturer preselected channel carrier in said band, said manufacturer preselected available channel carrier being predetermined to allow said user to ensure channel compatibility with a television receiver coupled to said video receiver upon activation of said second user operated means; and (c) modulating a channel carrier selected in accordance with steps (a) or (b) with said received video information to produce said compatible output signal.

9. A method according to claim 8, further including the step of replacing automatically an existing channel carrier with said manufacturer preselected channel carrier.

10. A method according to claim 8, further including the step of re-establishing automatically a previous channel carrier selected in step (b) by recalling said carrier selected in step (b) from memory.

11. A method according to claim 9, further including the step of re-establishing automatically a channel carrier selected in step (b) by recalling said carrier selected in step (b) from memory.

12. In a video signal receiver for modulating a channel carrier with received input information to provide a modulated output signal compatible with a television signal receiver, said carrier being located in a television broadcast band associated with a single video transmission standard, apparatus comprising:

means for generating channel carriers at carrier frequencies within said band, and having a control input and an output for providing a generated channel carrier in response to a control signal applied to said control input;

(a) a first user controllable switching network coupled to said control input of said generating means for causing said generating means to provide a manufacturer preselected channel carrier in said band;

(b) a second user controllable switching network coupled to said control input of said generating means for causing said generating means to provide a channel carrier in said band other than said manufacturer preselected channel carrier, irrespective of the position of said first switching network, said manufacturer preselected available channel carrier being predetermined to allow said user to ensure channel compatibility with a television receiver coupled to said video receiver upon activation of said second user operated means; and means, having an input coupled to said output of said generating means, for modulating a carrier selected by said first switching network or a carrier selected by said second switching network with said received input information to provide said modulated output signal.

* * * * *